(12) United States Patent
Horne et al.

(10) Patent No.: US 8,531,913 B2
(45) Date of Patent: Sep. 10, 2013

(54) ESTIMATING SUBSURFACE ELASTIC PARAMETERS

(75) Inventors: Stephen Allan Horne, Tokyo (JP); Douglas E. Miller, Boston, MA (US)

(73) Assignee: WesternGeco L.L.C., Houston, TX (US)

( * ) Notice: Subject to any disclaimer, the term of this patent is extended or adjusted under 35 U.S.C. 154(b) by 849 days.

(21) Appl. No.: 12/476,640

(22) Filed: Jun. 2, 2009

(65) Prior Publication Data

US 2010/0302903 A1 Dec. 2, 2010

(51) Int. Cl.
*G01V 1/32* (2006.01)
*G01V 1/42* (2006.01)

(52) U.S. Cl.
USPC .................................. 367/21; 367/15; 367/73

(58) Field of Classification Search
USPC ................................................ 367/15, 21, 73
See application file for complete search history.

(56) References Cited

U.S. PATENT DOCUMENTS

| | | | | |
|---|---|---|---|---|
| 5,737,220 | A | | 4/1998 | Miller |
| 6,714,480 | B2 | * | 3/2004 | Sinha et al. ..................... 367/31 |
| 6,922,373 | B2 | * | 7/2005 | Armstrong ...................... 367/73 |
| 2003/0195705 | A1 | * | 10/2003 | Leaney ............................ 702/14 |
| 2004/0052159 | A1 | * | 3/2004 | Armstrong ......................... 367/4 |
| 2009/0213692 | A1 | * | 8/2009 | Martinez et al. ................ 367/52 |

OTHER PUBLICATIONS

Leaney, et al., "Analysis of multiazimuthal VSP data for anisotropy and AVO", Geophysics, vol. 64, No. 4 (Jul.-Aug. 1999), pp. 1172-1180.

Grechka, et al., "Anisotropy estimation from marine 3D VSP data", OTC 17866, Offshore Technology Conference, Houston, Texas, May 2006.
Horne, et al., "Anisotropic slowness inversion using 3D VSP data".
Miller, et al., "An exact inversion for anisotropic moduli from phase slowness data", Journal of Geophysical Research, vol. 99, No. B11, pp. 21651-21657, Nov. 10, 1994.
Miller, et al., "An in situ estimation of anisotropic elastic moduli for a submarine shale", Journal of Geophysical Research, vol. 99, No. B11, pp. 21659-21665, Nov. 10, 1994.
Horne et al., "Anisotropic slowness inversion using 3D VSP data," Society of Exploration Geophysicists; 2008 SEG Annual Meeting, Nov. 2008, Las Vegas, Nevada; Doc ID 2008-2947.
Gaiser, "Transversely Isotropic Phase Velocity Analysis From Slowness Estimates," Journal of Geophysical Research, Jul. 1990, vol. 95(B7): pp. 11, 241-11, 254.
Schoenberg et al., "Seismic anisotropy of fractured rock," Geophysics, Jan.-Feb. 1995, vol. 60(1): pp. 204-211.
Thomsen, "Weak elastic anisotropy," Geophysics, Oct. 1986, vol. 51(10): pp. 1954-1966.
White et al., "Measured Anisotropy in Pierre Shale," Geophysical Prospecting, 1983, vol. 31: pp. 709-725.

* cited by examiner

*Primary Examiner* — Eric Bolda

(57) ABSTRACT

A method for estimating subsurface elastic parameters is described herein. One or more slowness vectors may be determined based on a vertical seismic profile of a subsurface area. A model containing anisotropy parameters and a well deviation estimate may be generated based on survey data. The slowness vectors may be corrected for the well deviation estimate based on the model. One or more modeled slowness vectors may be calculated using the corrected slowness vectors and the anisotropy parameters in the model.

20 Claims, 4 Drawing Sheets

ESTIMATING SUBSURFACE ELASTIC PARAMETERS

BACKGROUND

1. Field of the Invention

Implementations of various techniques described herein generally relate to techniques for processing seismic data, and more particularly, to techniques for estimating elastic parameters.

2. Description of the Related Art

The following descriptions and examples do not constitute an admission as prior art by virtue of their inclusion within this section.

When a material is said to be anisotropic it means that its properties vary with the direction in which it is measured. For example, the speeds of compressional waves in a sedimentary rock are typically lower when measured in the vertical direction compared with a similar measurement taken in a horizontal direction.

Typically, anisotropic formations result from fine layering, which tends to be horizontal, resulting in a so-called Vertical Transverse Isotropic (VTI) composite. It is also possible for these layers to contain aligned, near-vertical fractures, resulting in a composite rock that may possess orthorhombic symmetry.

Seismic measurements, such as seismic reflection surveys, are sensitive to the elastic properties of the rock, and thus, the elastic anisotropy. Failure to account for elastic anisotropy can lead to poor seismic images that may be poorly focused. Poor seismic images may also represent inaccuracies in depth that may lead to expensive failures in hydrocarbon field development. For these reasons, measurements of seismic anisotropy are of great value in the seismic industry.

Seismic anisotropy can be estimated using appropriately designed Vertical Seismic Profile (VSP) surveys. If anisotropy estimates are to be determined over an interval intersected by a well-bore, then placement of a receiver array over this depth range may allow the extraction of elastic anisotropy parameters using several different methods.

One particularly advantageous VSP arrangement is the walkaway VSP. In this configuration the source is moved to progressively further offsets along the surface, while the receivers remain in a fixed location. The walkaway VSP may provide a 2-dimensional (2D) image of the subsurface that can be of higher resolution than surface seismic data. Additionally, the walkaway VSP may provide more continuous coverage than other VSP types, such as an offset VSP. The receivers are typically 3-component and are sensitive to motion along three orthogonal directions.

In a 3-dimensional (3D) VSP survey, seismic sources are deployed over an area forming a grid or spiral pattern. Such surveys may be used to enhance 3D seismic images in areas where the surface seismic data do not provide an adequate image. The inadequacy of the image may be due to near-surface effects, or surface obstructions.

Typically, a 3-component wavefield may be decomposed into polarization and slowness components that may be resolved along the well-bore. The polarization and slowness components may then be inverted to yield estimates of the elasticity. These wavefield properties of polarization and slowness components also provide an advantage in that they are dependent only on the local elasticity over the receiver array. As such, the VSP surveys may be used in the formations with arbitrary overburden complexity.

In the case that the geology can be considered plane layered, it may be possible to construct slowness curve data from measurements of the direct P-wave arrival using a walkaway VSP.

In the case that 3D VSP data are available, a slowness surface may be constructed. Such 3D data may allow the inversion of more complicated forms of anisotropy that describe propagation effects that change with the azimuth angle as well as changes with respect to the inclination angle.

SUMMARY

Described herein are implementations of various technologies for estimating subsurface elastic parameters. One or more slowness vectors may be determined based on a vertical seismic profile of a subsurface area. The slowness vectors may include a first horizontal slowness, a second horizontal slowness and an apparent vertical slowness.

A model containing anisotropy parameters and a well deviation estimate may be generated based on survey data. The slowness vectors may be corrected for the well deviation estimate based on the model. The slowness vectors may be corrected by recovering a true vertical slowness from the apparent vertical slowness and the well deviation estimate. One or more modeled slowness vectors may be calculated using the corrected slowness vectors and the anisotropy parameters in the model.

In another implementation, the modeled slowness vectors may be compared with the corrected slowness vectors. The magnitudes of the corrected slowness vectors and the magnitudes of the modeled slowness vectors can be compared using a suitable metric. Whether the model is representative of the subsurface area may be determined based on this comparison. If the model is representative of the elastic anisotropy, the model may be used to enhance a seismic image.

In another implementation, the modeled slowness vectors may be calculated with the Kelvin-Christoffel equation. The Kelvin-Christoffel equation may use phase directions of the corrected slowness vectors, and elastic constants. The elastic constants may be calculated using the anisotropy parameters in the model.

BRIEF DESCRIPTION OF THE DRAWINGS

Implementations of various technologies will hereafter be described with reference to the accompanying drawings. It should be understood, however, that the accompanying drawings illustrate only the various implementations described herein and are not meant to limit the scope of various technologies described herein.

DETAILED DESCRIPTION

The discussion below is directed to certain specific implementations. It is to be understood that the discussion below is only for the purpose of enabling a person with ordinary skill in the art to make and use any subject matter defined now or later by the patent "claims" found in any issued patent herein.

The following paragraph provides a brief summary of various techniques described herein. In general, a method for estimating elastic parameters is described. A model containing parameters describing the elastic anisotropy may be generated based on a priori data about a subsurface region. In addition, the model may include an estimate of the well deviation. Multiple slowness triplets may be determined from a Vertical Seismic Profile (VSP) of the subsurface region. The slowness triplets may be corrected for the estimated well deviation in the model.

Modeled slowness vectors may be calculated based on the corrected slowness vectors and the anisotropy parameters contained in the model. The appropriateness of the model may be determined by comparing the magnitudes of the corrected slowness vectors with the magnitudes of the modeled slowness vectors. The process may be repeated with newly generated models if specified convergence criteria are not met. One or more implementations of those techniques will now be described in more detail with reference to FIGS. 1-4 in the following paragraphs.

Figure 1:
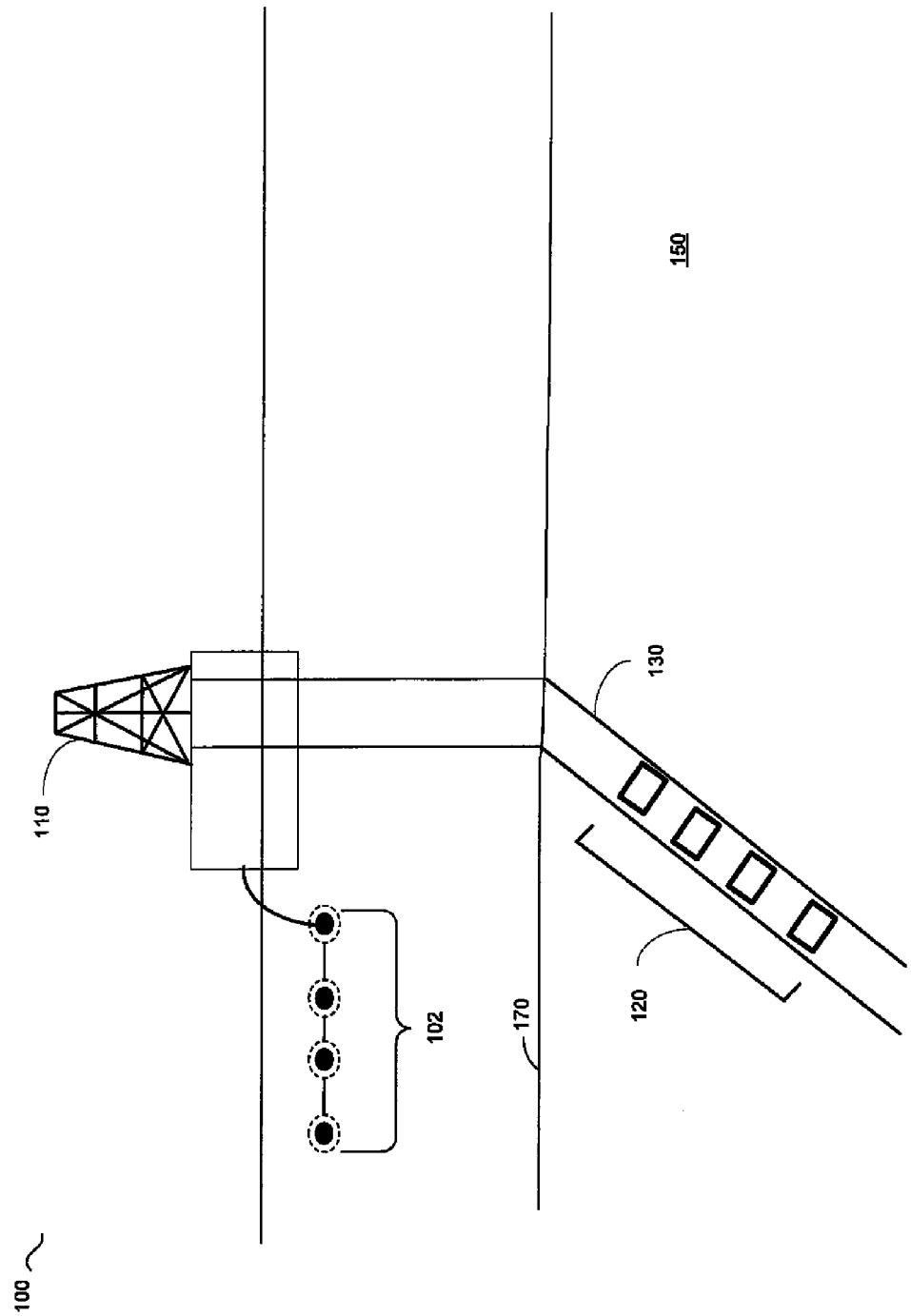
FIG. 1 illustrates a survey system for a Vertical Seismic Profile (VSP) in accordance with implementations described herein.

FIG. 1 illustrates a survey system 100 for a walkaway Vertical Seismic Profile (VSP) in accordance with implementations described herein. In a marine environment, a rig 110 may have multiple seismic sources such as airguns 102, attached. The rig 110 may be positioned over a subsea well-bore 130. As shown, survey system 100 may include multiple seismic sensors 120, disposed at different depths within the well-bore 130.

The airguns 102 may generate elastic waves (not shown), a portion of which are partially reflected by the sea bed 170, and a portion of which propagate into a subsurface 150. The elastic waves may travel to one or more of the seismic sensors 120. The sensors 120 may sense the elastic waves and generate electrical signals (not shown) representative of the received elastic waves. Additionally, the sensors 120 may transmit the electrical signals, referred to as seismic traces, to the rig 110 where they are recorded.

The electrical signals may be embedded with information regarding the subsurface 150. The electrical signals may be transmitted to a data center, where the electrical signals may be captured as a record of VSP data. In one implementation, the electrical signals may be transmitted wirelessly.

The general term, VSP data, as used herein is intended to include data captured in one of various VSP types, such as walkaway VSP and 3D VSP data.

Once captured, the record of VSP data may be processed in accordance with various implementations described herein. In one implementation, a model containing anisotropy parameters that may be representative of the subsurface 150 may be generated. In another implementation, seismic images of the subsurface region 150 may be enhanced using the estimated anisotropy parameters in the model.

In some scenarios, the well-bore 130 may deviate from the vertical. In other words, the well-bore 130 may not be perpendicular to the sea-bed 170. Well-bores may deviate from the vertical because of dips in the subsurface 150.

Well-bores may also be deviated deliberately. The reasons for deliberate deviation may include increasing exposure to hydrocarbon-producing zones, to intersect a larger number of fractures, to follow a complex structure, or the like. In some scenarios, the well-bore 130 may even be turned to the horizontal. The angle at which the well-bore 130 diverges from the vertical is referred to as a deviation.

The deviation may distort the VSP data that is generated by the sensors 120. In such a case, the model produced in the data processing may include an estimate of the deviation. The estimate of the deviation may be used in the data processing to attenuate the distortion.

It should be noted that the marine environment is merely one example of an environment for performing the VSP. The VSP may also be performed in other environments, such as land, deltas, and swamps.

Figure 2:
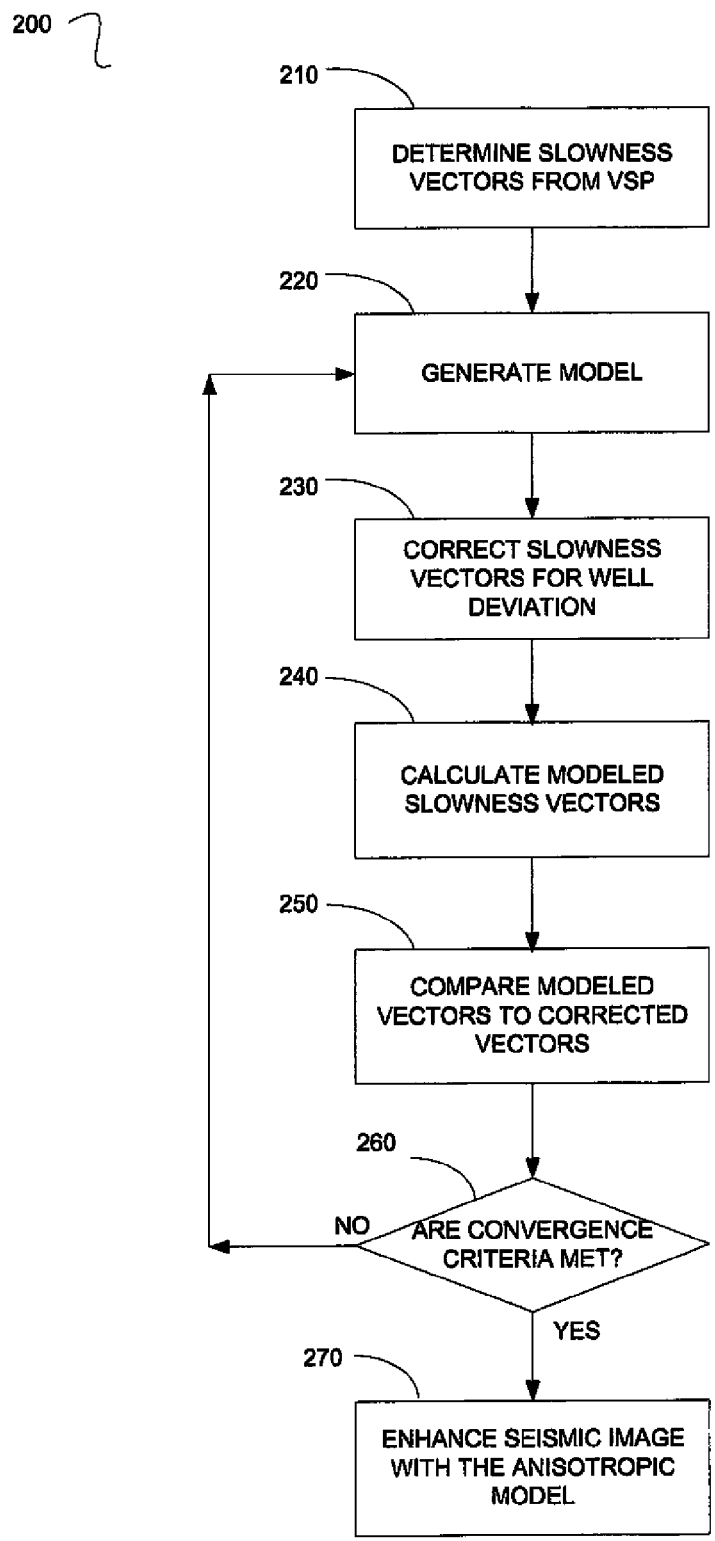
FIG. 2 illustrates a flow chart of a method for estimating elastic parameters of a subsurface in accordance with implementations described herein.

FIG. 2 illustrates a flow chart of a method 200 for estimating elastic parameters of a subsurface in accordance with implementations described herein. Method 200 may be performed on the VSP data, in a data center, as described above. The data center is described in greater detail with reference to FIG. 4.

It should be understood that while the flow chart indicates a particular order of execution, in some implementations, certain steps of Method 200 may be executed in a different order.

At step 210, multiple slowness vectors may be determined from VSP data. Herein, slowness vectors are also referred to as slowness triplets. The slowness triplet may be a vector that describes the directional velocity variations of a wave—two horizontals ($H_1$, and $H_2$) and one vertical S. For the sake of clarity, the slowness vectors are referenced as follows:

($H_1 H_2 S$)

Slowness Vector

At step 220, a model describing anisotropy parameters may be generated from a priori data. Data from prior seismic surveys of the subsurface 150 may be used to estimate a model of the subsurface 150. The a priori data may include pre-stack depth migration anisotropy estimates or results from high order pre-stack moveout analysis. The model may describe the anisotropy in terms of elastic constants or anisotropy parameters that describe the subsurface 150. In addition to the anisotropy description, the model may also include an estimated well deviation.

The elastic constants may be the ratio of stress to strain when the subsurface region 150 is deformed. Because velocities depend on elastic constants and density only through the ratio of elastic constants to densities, the elastic constants may be normalized for density. In other words, the elastic constants may be divided by a density value when generating the model.

Relations between the elastic constants may have a prescribed symmetry such as, monoclinic, orthorhombic, or transversely isotropic. Additionally, the elastic constants may be constrained by equations to be satisfied by anisotropy parameters.

The anisotropy parameters in the model may be parameters from which elastic constants may be calculated. For example, in a scenario where the symmetry prescribed is transversely isotropic, the anisotropy parameters may include background P-wave and background shear wave velocities and the Thomsen parameters.

There are two Thomsen anisotropy parameters. One of these Thomsen anisotropy parameters describes the difference between the horizontal and vertical velocities, whilst the difference between the two Thomsen anisotropy parameters is an indication of the annellipticity of the velocity variations.

The anisotropy parameters may also include parameters that represent a weakening of the subsurface area due to fractures and angles representing the orientation of the anisotropy.

At step 230, the slowness vectors may be corrected for well deviation based on the model. The well deviation may distort the slowness data. As a result, the measured slowness, S, may only be an apparent vertical slowness. The true vertical slowness, $S_C$, may be recovered from the apparent vertical slowness, S, using the estimated well deviation described in the model. Because only the vertical slowness, S, of the slowness vector, $(H_1 H_2 S)$, may be changed in the correction, the corrected slowness vectors may be represented as:

$$(H_1 H_2 S_C).$$

Corrected Slowness Vector

At step 240, modeled slowness vectors may be calculated using the corrected slowness vectors and the anisotropy parameters in the model. Similar to the corrected slowness vectors, the modeled slowness vectors may represent directional velocity variations. However, the modeled slowness vectors may represent velocities based on the anisotropy parameters in the model. Step 240 is described in more detail in the paragraphs below with reference to FIG. 3. For the sake of clarity, the modeled slowness vectors are referenced as follows:

$$(H_{M1} H_{M2} S_M)$$

Modeled Slowness Vector

At step 250, the modeled slowness vectors may be compared to the corrected slowness vectors. Similarities between the modeled slowness vectors and the corrected slowness vectors may indicate the extent to which the anisotropy parameters in the model are representative of the subsurface 150.

In one implementation, the magnitudes of the modeled slowness vectors may be compared to the magnitudes of the corrected slowness vectors. In such an implementation, the magnitudes of the modeled slowness vectors, and the corrected slowness vectors may be calculated. The difference between the magnitudes of the modeled slowness vectors and the corrected slowness vectors may be calculated.

At step 260, a determination is made as to whether convergence criteria that indicate that the anisotropy parameters in the model are representative of the subsurface 150 have been met. In one implementation, the difference in magnitudes may be used as a convergence criterion to determine whether the anisotropy parameters in the model are representative of the subsurface 150.

In such an implementation, an appropriate objective function may be used to make this determination. The appropriate objective function may depend on the type of noise in the VSP data. For example, if the noise in the VSP data follows a Gaussian distribution, a least squares function may be used.

In another implementation, the convergence criteria may include a specified threshold for the difference in magnitudes. If the difference in magnitudes, squared, falls below the specified threshold, the anisotropy parameters in the model may be determined to be representative of the subsurface 150.

If the noise in the VSP data follows a Laplacian distribution (more outliers than the Gaussian distribution), a least absolute values function may be used to determine whether the model is representative of the subsurface 150. In such a case, if the absolute value of the difference between the values of the magnitudes falls below this threshold, the anisotropy parameters in the model may be determined to be representative of the subsurface 150.

In yet another implementation, the convergence criteria may include a specified number of models that are generated before the model may be determined to be representative of the subsurface 150.

If the convergence criteria are not met, the flow may return to step 220 where a new model may be generated. In one implementation, the new model may be generated as a random jump from the previously generated model. In another implementation, the new model may be generated using the differences between the modeled slowness vectors and the VSP data.

Once the convergence criteria are met, the method flows to step 270, where the model may be used in any number of utilities. In one implementation, at step 270, a seismic image may be enhanced using the anisotropy parameters in the model.

In the case that the anisotropy is caused by aligned fractures it is possible to use the information derived from the model parameters to estimate the fracture orientation. Such information is useful for planning well drilling, for example, to drill the well in such direction to intersect as many fractures as possible.

Figure 3:
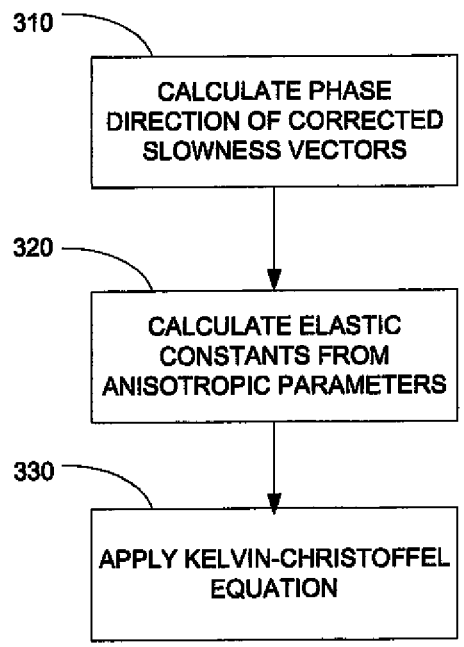
FIG. 3 illustrates a flow chart of a step for modeling slowness vectors in accordance with implementations described herein.

FIG. 3 illustrates a flow chart of a method 300 for calculating modeled slowness vectors in accordance with implementations described herein. It should be understood that while the flow chart indicates a particular order of execution, in some implementations, certain operations of method 300 may be executed in a different order.

At step 310, phase directions of the corrected slowness vectors may be calculated. The phase directions may represent unit vectors of the corrected slowness vectors. Accordingly, the magnitudes of the corrected slowness vectors may be calculated. The phase directions may then be calculated by dividing the corrected slowness vectors by their respective magnitudes. As such, the phase directions may be represented as:

$$\frac{(H_1 H_2 S_C)}{\sqrt{H_1^2 + H_2^2 + S_C^2}}$$

Phase Direction

The following step may be performed if the model contains anisotropy parameters instead of elastic constants. Otherwise, the flow may continue at step 330.

At step 320, elastic constants may be calculated from the anisotropy parameters in the model. As stated previously, the model may contain anisotropy parameters from which the elastic constants may be calculated, such as, background P-wave and background shear wave velocities.

At step 330, the Kelvin-Christoffel equation may be applied, using the elastic constants and the phase directions. The Kelvin-Christoffel equation may be used to calculate the modeled slowness vectors.

Figure 4:
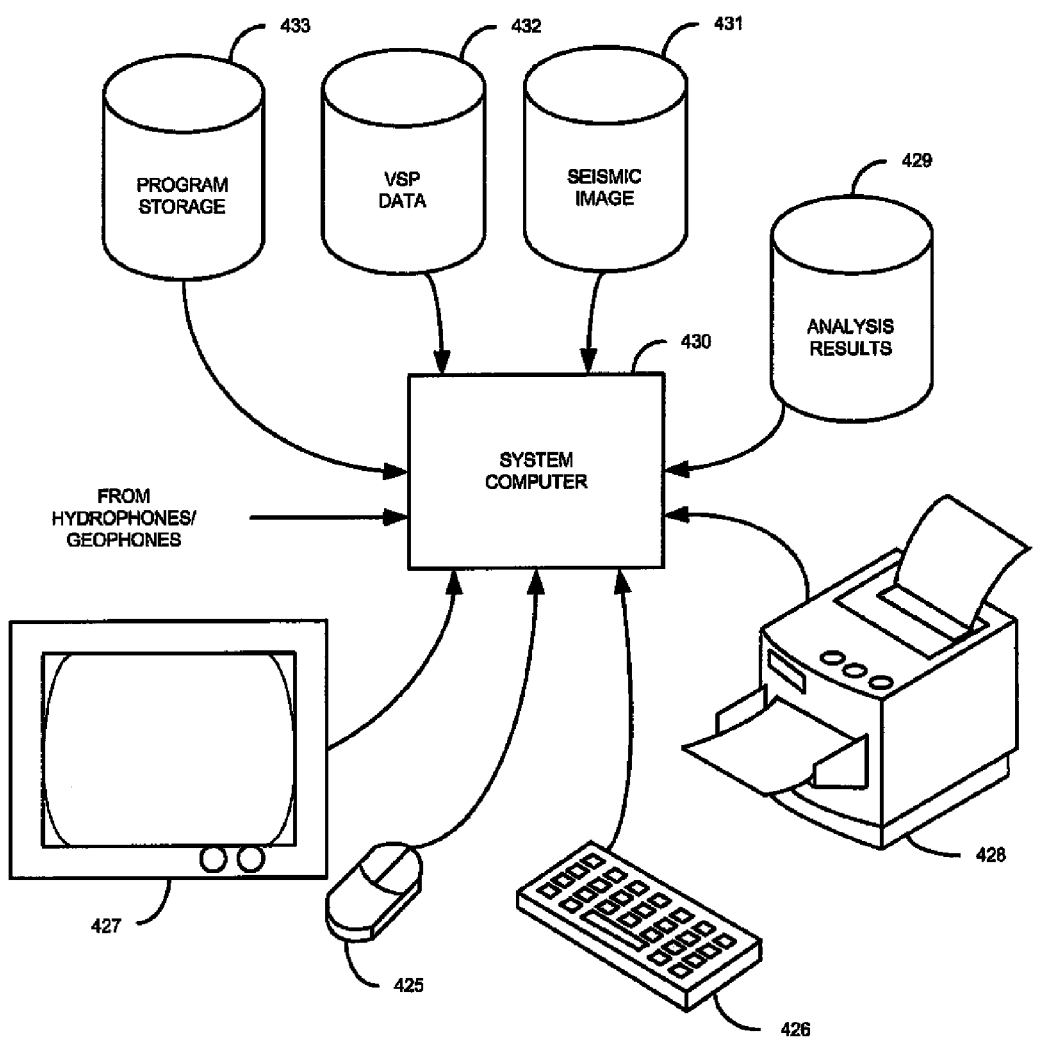
FIG. 4 illustrates a computing system, into which implementations of various technologies described herein may be implemented.

FIG. 4 illustrates a computing system 400, into which implementations of various technologies described herein may be implemented. The computing system 400 may include one or more system computers 430, which may be implemented as any conventional personal computer or server. However, those skilled in the art will appreciate that implementations of various technologies described herein may be practiced in other computer system configurations, including hypertext transfer protocol (HTTP) servers, handheld devices, multiprocessor systems, microprocessor-based or programmable consumer electronics, network PCs, minicomputers, mainframe computers, and the like.

The system computer 430 may be in communication with disk storage devices 429, 431, 432, and 433, which may be external hard disk storage devices. It is contemplated that disk storage devices 429, 431, 432, and 433 are conventional hard disk drives, and as such, will be implemented by way of a local area network or by remote access. Of course, while disk storage devices 429, 431, 432, and 433 are illustrated as separate devices, a single disk storage device may be used to store any and all of the program instructions, measurement data, and results as desired.

In one implementation, a seismic image that is generated based on a seismic survey of the subsurface 150 may be stored in disk storage device 431. Additionally, VSP data from the receivers 120 may be stored in disk storage device 432. The system computer 430 may retrieve the appropriate data from the disk storage devices 431, 432 to process seismic data according to program instructions that correspond to implementations of various technologies described herein. The program instructions may be written in a computer programming language, such as C++, Java and the like.

The program instructions may be stored in a computer-readable medium, such as program disk storage device 433. Such computer-readable media may include computer storage media and communication media.

Computer storage media may include volatile and nonvolatile, and removable and non-removable media implemented in any method or technology for storage of information, such as computer-readable instructions, data structures, program modules or other data.

Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the system computer 430.

Communication media may embody computer-readable instructions, data structures, program modules or other data in a modulated data signal, such as a carrier wave or other transport mechanism and may include any information delivery media. The term, modulated data signal, may mean a signal that has one or more of its characteristics set or changed in such a manner as to encode information in the signal.

By way of example, and not limitation, communication media may include wired media such as a wired network or direct-wired connection, and wireless media such as acoustic, RF, infrared and other wireless media. Combinations of any of the above may also be included within the scope of computer-readable media.

In one implementation, the system computer 430 may present output primarily onto graphics display 427, or alternatively via printer 428. As an example, the subsurface elastic parameters may be presented on graphics display 427. The system computer 430 may store the results of the methods described above on disk storage 429, for later use and further analysis. The keyboard 426 and the pointing device (e.g., a mouse, trackball, or the like) 425 may be provided with the system computer 430 to enable interactive operation.

The system computer 430 may be located at a data center remote from the survey region. The system computer 430 may be in communication with the receivers (either directly or via a recording unit, not shown), to receive signals indicative of the reflected seismic energy. These signals, after conventional formatting and other initial processing, may be stored by the system computer 430 as digital data in the disk storage devices 431, 432 for subsequent retrieval and processing in the manner described above.

While FIG. 4 illustrates the disk storage devices 431, 432 as directly connected to the system computer 430, it is also contemplated that the disk storage devices 431, 432 may be accessible through a local area network or by remote access. Furthermore, while disk storage devices 429, 431, 432 are illustrated as separate devices for storing input seismic data and analysis results, the disk storage devices 429, 431, 432 may be implemented within a single disk drive (either together with or separately from program disk storage device 433), or in any other conventional manner as will be fully understood by one of skill in the art having reference to this specification.

While the foregoing is directed to embodiments of the present invention, other and further embodiments of the invention may be devised without departing from the basic scope thereof, and the scope thereof is determined by the claims that follow.

What is claimed is:

1. A method for estimating subsurface elastic parameters, comprising:
   determining one or more slowness vectors based on a vertical seismic profile of a subsurface area, wherein the slowness vectors comprise a first horizontal slowness, a second horizontal slowness and an apparent vertical slowness;
   generating a model containing anisotropy parameters and a well deviation estimate based on survey data;
   correcting the slowness vectors for the well deviation estimate based on the model; and
   calculating, using a microprocessor, one or more modeled slowness vectors using the corrected slowness vectors and the anisotropy parameters in the model.

2. The method of claim 1, further comprising:
   comparing the modeled slowness vectors with the corrected slowness vectors;
   determining whether the model is representative of the subsurface area based on the comparison; and
   using the model to enhance a seismic image upon determining that the model is representative of the subsurface area.

3. The method of claim 1, wherein the model comprises elastic constants.

4. The method of claim 1, wherein the anisotropy parameters comprise:
   Thomsen parameters;
   parameters that represent a weakening of the subsurface area due to fractures;
   a background P-wave velocity and a background shear wave velocity;
   angles representing an orientation of anisotropy of the subsurface area; or
   combinations thereof.

5. The method of claim 1, wherein calculating the modeled slowness vectors comprises:
   calculating a magnitude of the corrected slowness vectors;
   calculating a phase direction of the corrected slowness vectors using the magnitude of the corrected slowness vectors;
   calculating one or more elastic constants using the anisotropy parameters in the model; and
   calculating the modeled slowness vectors with the Kelvin-Christoffel equation, using the phase directions and the elastic constants.

6. The method of claim 2, wherein comparing the modeled slowness vectors with the corrected slowness vectors comprises:
calculating a magnitude of the corrected slowness vectors;
calculating a magnitude of the modeled slowness vectors; and
determining a difference between the magnitude of the corrected slowness vectors and the magnitude of the modeled slowness vectors.

7. The method of claim 1, wherein correcting the slowness vectors for the well deviation estimate comprises recovering a true vertical slowness from the apparent vertical slowness and the well deviation estimate.

8. The method of claim 1, wherein the modeled slowness vectors are calculated using the Kelvin-Christoffel equation.

9. The method of claim 1, wherein the survey data comprises a priori data.

10. A non-transitory computer-readable medium having stored thereon program instructions executable by a processor to:
determine one or more slowness vectors based on a vertical seismic profile of a subsurface area, wherein the slowness vectors comprise a first horizontal slowness, a second horizontal slowness and an apparent vertical slowness;
generate a model containing anisotropy parameters based on a priori data, wherein the model comprises anisotropy parameters and a well deviation estimate;
correct the slowness vectors for the well deviation estimate based on the model; and
calculate one or more modeled slowness vectors using the corrected slowness vectors and the anisotropy parameters in the model.

11. The non-transitory computer-readable medium of claim 10, further comprising program instructions executable by the processor to use the model to:
compare the modeled slowness vectors with the corrected slowness vectors;
determine whether the model is representative of the subsurface area based on the comparison; and
enhance a seismic image if the model is representative of the subsurface area.

12. The non-transitory computer-readable medium of claim 11, wherein the program instructions executable by the processor to compare the modeled slowness vectors with the corrected slowness vectors comprise program instructions executable by the processor to:
calculate a magnitude of the corrected slowness vectors;
calculate a magnitude of the modeled slowness vectors; and
determine a difference between the magnitude of the corrected slowness vectors and the magnitude of the modeled slowness vectors.

13. The non-transitory computer-readable medium of claim 10, wherein the program instructions executable by the processor to correct the slowness vectors for the well deviation estimate comprise program instructions executable by the processor to recover a true vertical slowness from the apparent vertical slowness and the well deviation estimate.

14. The non-transitory computer-readable medium of claim 10, wherein the program instructions executable by the processor to calculate the modeled slowness vectors comprise program instructions executable by the processor to:
calculate a magnitude of the corrected slowness vectors;
calculate a phase direction of the corrected slowness vectors using the magnitude of the corrected slowness vectors;
calculate one or more elastic constants using the anisotropy parameters; and
calculate the modeled slowness vectors applying the Kelvin-Christoffel equation, using the phase direction and the elastic constants.

15. A system, comprising:
a processor; and
a memory comprising program instructions executable by the processor to:
determine one or more slowness vectors based on a vertical seismic profile of a subsurface area, wherein the slowness vectors comprise a first horizontal slowness, a second horizontal slowness and an apparent vertical slowness;
generate a model based on a priori data, wherein the model comprises anisotropy parameters and a well deviation estimate;
correct the slowness vectors for the well deviation estimate based on the model;
calculate one or more modeled slowness vectors using the corrected slowness vectors and the model;
compare the modeled slowness vectors with the corrected slowness vectors;
determine whether the model is representative of the subsurface area based on the comparison and a convergence criteria; and
use the model to enhance a seismic image upon determining that the model is representative of the subsurface area.

16. The system of claim 15, wherein the convergence criteria comprises a specified threshold for a difference in a magnitude of the modeled slowness vectors and a magnitude in the corrected slowness vectors, and determining the model to be representative of the subsurface area if the difference is less than the specified threshold.

17. The system of claim 15, wherein the convergence criteria comprise a specified threshold for an absolute value of a difference between an absolute value of a magnitude of the modeled slowness vectors and the corrected slowness vectors, and determining the model to be representative of the subsurface area if the absolute value of the difference is less than the specified threshold.

18. The system of claim 15, wherein the convergence criteria comprises a specified threshold for a squared value of a difference between a magnitude of the modeled slowness vectors and a magnitude of the corrected slowness vectors, and determining the model to be representative of the subsurface area if the squared value of the difference is less than the specified threshold.

19. The system of claim 15, wherein the program instructions executable by the processor to calculate the modeled slowness vectors comprise program instructions executable by the processor to:
calculate a magnitude of the corrected slowness vectors;
calculate a phase direction of the corrected slowness vectors using the magnitude of the corrected slowness vectors;
calculate one or more elastic constants using the anisotropy parameters; and
calculate the modeled slowness vectors applying the Kelvin-Christoffel equation, using the phase direction and the elastic constants.

20. The system of claim 15, wherein the program instructions executable by the processor to compare the modeled slowness vectors with the corrected slowness vectors comprise program instructions executable by the processor to:
calculate a magnitude of the corrected slowness vectors;

calculate a magnitude of the modeled slowness vectors; and determine a difference between the magnitude of the corrected slowness vectors and the magnitude of the modeled slowness vectors.

\* \* \* \* \*